United States Patent
Seki et al.

(10) Patent No.: US 9,437,865 B2
(45) Date of Patent: Sep. 6, 2016

(54) ACTIVE MATERIAL FOR LITHIUM ION SECONDARY BATTERY, AND LITHIUM ION SECONDARY BATTERY

(71) Applicant: TDK CORPORATION, Tokyo (JP)

(72) Inventors: Hideaki Seki, Tokyo (JP); Tomohiko Kato, Tokyo (JP); Hirofumi Nakano, Tokyo (JP); Atsushi Sano, Tokyo (JP)

(73) Assignee: TDK CORPORATION, Tokyo (JP)

( * ) Notice: Subject to any disclaimer, the term of this patent is extended or adjusted under 35 U.S.C. 154(b) by 9 days.

(21) Appl. No.: 14/387,801

(22) PCT Filed: Mar. 26, 2013

(86) PCT No.: PCT/JP2013/058665
§ 371 (c)(1),
(2) Date: Sep. 24, 2014

(87) PCT Pub. No.: WO2013/146723
PCT Pub. Date: Oct. 3, 2013

(65) Prior Publication Data
US 2015/0064558 A1    Mar. 5, 2015

(30) Foreign Application Priority Data

Mar. 27, 2012 (JP) .................................. 2012-070941

(51) Int. Cl.
*H01M 4/505* (2010.01)
*H01M 4/131* (2010.01)
(Continued)

(52) U.S. Cl.
CPC .............. *H01M 4/131* (2013.01); *H01M 4/485* (2013.01); *H01M 4/505* (2013.01); *H01M 4/525* (2013.01); *H01M 10/0525* (2013.01); *H01M 2004/028* (2013.01); *Y02E 60/122* (2013.01)

(58) Field of Classification Search
CPC ....... H01M 4/52; H01M 4/505; H01M 4/525
See application file for complete search history.

(56) References Cited

U.S. PATENT DOCUMENTS

| | | | | |
|---|---|---|---|---|
| 2009/0121198 | A1* | 5/2009 | Kajiya | C01G 45/1228 252/519.15 |
| 2010/0086853 | A1* | 4/2010 | Venkatachalam | H01M 4/1391 429/223 |

FOREIGN PATENT DOCUMENTS

| | | |
|---|---|---|
| JP | A-9-55211 | 2/1997 |
| JP | A-2006-93067 | 4/2006 |

(Continued)

OTHER PUBLICATIONS

Jul. 2, 2013 International Search Report issued in International Patent Application No. PCT/JP2013/058665 (with translation).

(Continued)

*Primary Examiner* — Stewart Fraser
*Assistant Examiner* — Olatunji Godo
(74) *Attorney, Agent, or Firm* — Oliff PLC

(57) ABSTRACT

To provide an active material having high capacity and excellent cycle characteristics. An active material has a layered crystal structure and is expressed by a compositional formula (1) $Li_yNi_aCo_bMn_cM_dO_x$ (1), where the element M is at least one kind of element selected from the group consisting of Al, Si, Zr, Ti, Fe, Mg, Nb, Ba, and V; $1.9 \leq (a+b+c+d+y) \leq 2.1$; $1.05 \leq y \leq 1.35$; $0 < a \leq 0.3$; $0 < b \leq 0.25$; $0.3 \leq c \leq 0.7$; $0 \leq d \leq 0.1$; and $1.9 \leq x \leq 2.1$, and wherein $0.69 \leq Ni_\beta/Ni_\alpha \leq 0.85$, where $Ni_\alpha$ is the Ni composition amount at a center portion of the active material primary particle, and $Ni_\beta$ is the Ni composition amount in the vicinity of a surface (in a width of 30 nm from the surface).

12 Claims, 4 Drawing Sheets

(51) Int. Cl.
*H01M 4/525* (2010.01)
*H01M 4/485* (2010.01)
*H01M 10/0525* (2010.01)
*H01M 4/02* (2006.01)

(56) References Cited

FOREIGN PATENT DOCUMENTS

| JP | A-2007-48711 | 2/2007 |
| JP | A-2007-66745 | 3/2007 |
| JP | A-2011-129498 | 6/2011 |
| WO | WO 2006/123572 A1 | 11/2006 |

OTHER PUBLICATIONS

Yang-Kook Sun et al., "A novel concentration-gradient Li[Ni0.83Co0.07Mn0.10]O2 cathode material for high-energy lithium-ion batteries," Journal of Materials Chemistry, 2011, 21, 10108-10112.

\* cited by examiner

ACTIVE MATERIAL FOR LITHIUM ION SECONDARY BATTERY, AND LITHIUM ION SECONDARY BATTERY

TECHNICAL FIELD

The present invention relates to an active material for lithium ion secondary battery and a lithium ion secondary battery.

BACKGROUND ART

In recent years, expectations are growing for widespread use of various electric cars with a view to solving environment and energy problems. As a key to practical application of the electric cars, vigorous development of lithium ion secondary batteries as an on-board power supply for driving a motor, for example, is under way. However, in order for the battery to gain wide acceptance as the on-board power supply, the battery needs to have higher performance and be less expensive. There is also the need for the single-charge travel distance of the electric car to approach that of gasoline engine cars, giving rise to the demand for higher energy batteries.

In order to increase the energy density of a battery, it is necessary to increase the amount of electricity stored per unit mass of the positive electrode and the negative electrode. As a positive electrode material (active material for the positive electrode) with potential to address such need, a so-called solid solution system positive electrode is being studied. Among others, a solid solution (so-called Li-rich layered positive electrode material) of electrochemically inactive layered $Li_2MnO_3$ and electrochemically active layered $LiAO_2$ (A is a transition metal such as Co or Ni) is expected to provide a high-capacity positive electrode material capable of exhibiting a large electric capacity in excess of 200 mAh/g (see Patent Document 1 below).

CITATION LIST

Patent Documents

Patent Document 1: JP-A-9-55211
Patent Document 2: JP-A-2006-93067

SUMMARY OF THE INVENTION

Problem to be Solved by the Invention

However, in the solid solution system positive electrode using $Li_2MnO_3$ described in Patent Document 1, there is a problem that, while the discharge capacity is large, cycle characteristics are readily degraded by the repeated charging and discharging.

In Patent Document 2, there is also used a $Li[Li_qCo_xNi_yMn_z]O_2$ solid solution system positive electrode. However, in this case, there is a problem that, while cycle characteristics are good, initial discharge capacity is low.

The present invention was made in view of the problems of the conventional art, and has the purpose of providing a high-capacity active material with excellent cycle characteristics, and a lithium ion secondary battery.

Solution to the Problems

In order to achieve the purpose, an active material according to the present invention for lithium ion secondary battery has a layered crystal structure and is expressed by a compositional formula (1) below, $$Li_yNi_aCo_bMn_cM_dO_x \qquad (1)$$

where the element M is at least one kind of element selected from the group consisting of Al, Si, Zr, Ti, Fe, Mg, Nb, Ba, and V; $1.9 \leq (a+b+c+d+y) \leq 2.1$; $1.05 \leq y \leq 1.35$; $0 < a \leq 0.3$; $0 < b \leq 0.25$; $0.3 \leq c \leq 0.7$; $0 \leq d \leq 0.1$; and $1.9 \leq x \leq 2.1$. The active material is characterized in that $0.69 \leq Ni_\beta/Ni_\alpha \leq 0.85$, where $Ni_\alpha$ is a Ni composition amount at a center portion of a primary particle of the active material, and $Ni_\beta$ is a Ni composition amount in the vicinity of a surface.

It is believed that, when the active material of the present invention having the above features is used, desorption and insertion of lithium associated with charging and discharging are smoothly performed. General positive electrode active materials of nickel, cobalt, or manganese system have a layered crystal structure where a lithium layer and a transition metal layer are alternately overlapped. On the other hand, in the active material having the composition according to the present invention, a part of the transition metal layer is substituted with lithium. It is believed that, because of the structural feature of the active material of the present invention that $0.69 \leq Ni_\beta/Ni_\alpha \leq 0.85$, the amount of Ni composition in the primary particle surface is small, making it easier for lithium to enter the transition metal layer in the primary particle surface, or to move from the transition metal layer into the electrolytic solution. Namely, it is presumably due to the easing of the movement of lithium associated with charging and discharging that the present invention can provide high capacity and excellent cycle characteristics.

Preferably, in the active material of the present invention, the element M is Fe or V, and d is $0 < d \leq 0.1$.

A lithium ion secondary battery according to the present invention includes: a positive electrode including a positive electrode collector and a positive electrode active material layer containing a positive electrode active material; a negative electrode including a negative electrode collector and a negative electrode active material layer containing a negative electrode active material; a separator positioned between the positive electrode active material layer and the negative electrode active material layer; and an electrolyte in contact with the negative electrode, the positive electrode, and the separator. The positive electrode active material contains the above active material according to the present invention.

The lithium ion secondary battery according to the present invention including the active material of the present invention in the positive electrode active material layer provides high capacity and excellent cycle characteristics.

Effects of the Invention

The present invention provides an active material having high capacity and excellent cycle characteristics, and a lithium ion secondary battery.

BRIEF DESCRIPTION OF THE DRAWINGS

FIG. 2 (b) is a photograph of the active material primary particle according to Comparative Example 1 taken with the scanning transmission electron microscope (STEM), "+" portions in the photograph indicating portions where point analysis was performed by the energy dispersive X-ray spectroscopy (EDS) device attached to the STEM.

MODE FOR CARRYING OUT THE INVENTION

Figure 1:
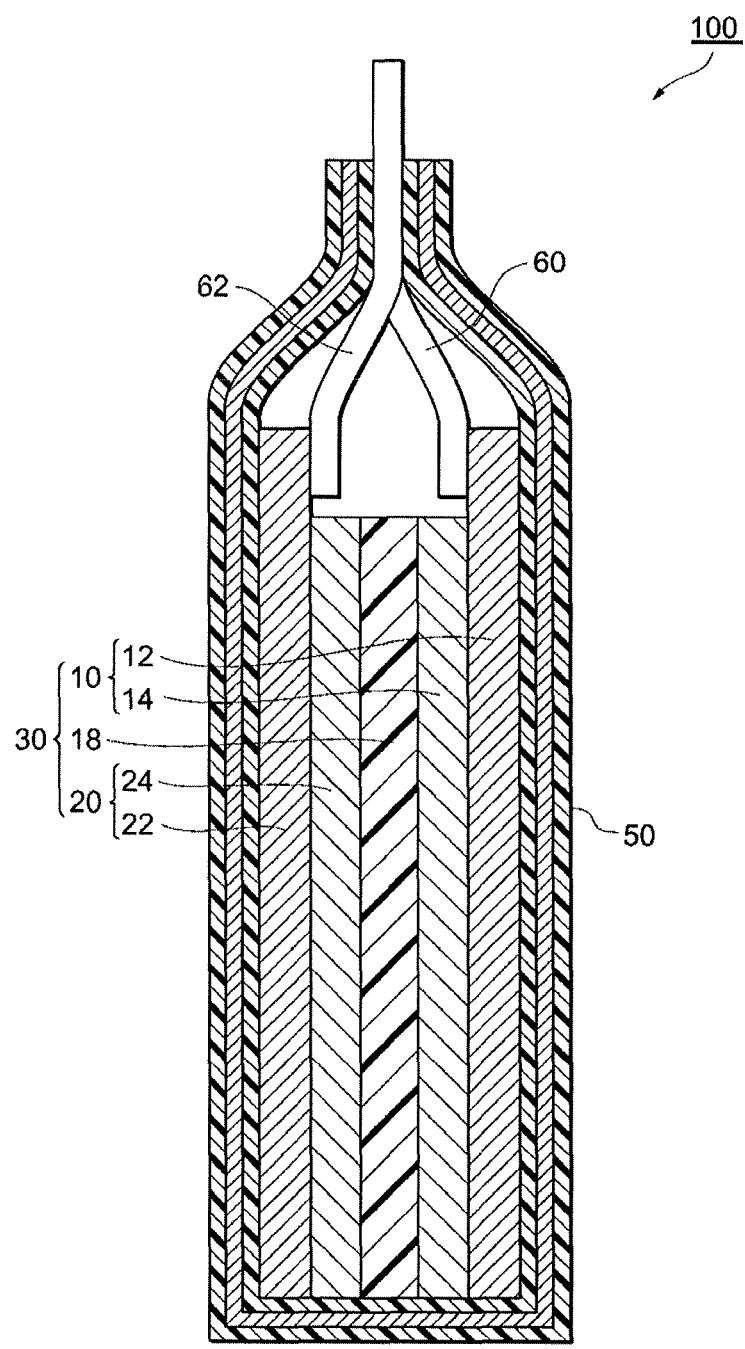
FIG. 1 is a schematic cross sectional view of a lithium ion secondary battery provided with a positive electrode active material layer including an active material formed from a precursor according to an embodiment of the present invention.

In the following, the active material according to an embodiment of the present invention, an active material manufacturing method, and a lithium ion secondary battery will be described. It should be noted that the present invention is not limited to the following embodiments.
(Active Material)

The active material according to the present embodiment comprises a lithium-containing complex oxide having a layered crystal structure and expressed by the following compositional formula (1).

$$Li_y Ni_a Co_b Mn_c M_d O_x \qquad (1)$$

where the element M is at least one kind of element selected from the group consisting of Al, Si, Zr, Ti, Fe, Mg, Nb, Ba, and V, $1.9 \leq (a+b+c+d+y) \leq 2.1$, where $1.05 \leq y \leq 1.35$, $0 < a \leq 0.3$, $0 < b \leq 0.25$, $0.3 \leq c \leq 0.7$, $0 \leq d \leq 0.1$, $1.9 \leq x \leq 2.1$, the oxide being characterized in that $0.69 \leq Ni_\beta/Ni_\alpha \leq 0.85$ where $Ni_\alpha$ is the Ni composition amount at a center portion of the active material primary particle, and $Ni_\beta$ is the Ni composition amount in the vicinity of a surface.

The "vicinity of a surface" herein refers to, normally, a region extending from the active material surface in a depth direction by approximately 30 nm, for example, indicating a region with the width of 30 nm from the surface of the active material as viewed in cross section by a microscope. The region, while obviously depending on the primary particle diameter of the active material, refers to a depth region up to approximately 15% from the surface with respect to the primary particle diameter.

Preferably, the composition range of Li is $1.10 \leq y \leq 1.35$ and more preferably $1.15 \leq y \leq 1.35$, and even more preferably $1.20 \leq y \leq 1.35$. With regard to $Ni_\beta/Ni_\alpha$, if the value is too low, stress to the crystal structure will be large; thus, the range may be $0.69 \leq Ni_\beta/Ni_\alpha \leq 0.80$ and preferably $0.69 \leq Ni_\beta/Ni_\alpha \leq 0.76$. With regard to an average particle diameter of the active material primary particle, preferably the average particle diameter is in the range of 0.2 to 1.0 μm and more preferably in the range of 0.2 to 0.5 μm. Further preferably, coarse particles of 10 μm or more are not present.

Desirably, the composition of M of the active material includes Fe or V, preferably of various valence modes, added thereto.

Preferably, Fe or V is added such that d in the compositional formula (1) is $0 < d \leq 0.1$.

Preferably, the active material is such that the peak half-value width of (003) in X-ray diffraction pattern, or FWHM (003), is FWHM $(003) \leq 0.13°$; the peak half-value width of (010), or FWHM (010), is FWHM $(010) \leq 0.15°$; and the peak half-value width of (104), or FWHM (104), is FWHM $(104) \leq 0.20°$. Further preferably, FWHM (003)/FWHM (104) is not more than 0.57.

The "layered crystal structure" herein is generally denoted as $LiAO_2$ (A is a transition metal such as Co, Ni, or Mn), referring to a structure in which a lithium layer, a transition metal layer, and an oxygen layer are layered in a single axis direction. Representative examples are $LiCoO_2$ and $LiNiO_2$ belonging to the α-$NaFeO_2$ type, which are of the rhombohedral system and attributed to the space group R (−3)m because of their symmetry. $LiMnO_2$ is of the orthorhombic system and attributed to the space group Pm2m because of its symmetry. $Li_2MnO_3$ may also be denoted as $Li[Li_{1/3}Mn_{2/3}]O_2$; although it is of the monoclinic system space group C2/m, it is a layered compound in which the Li layer, the $[Li_{1/3}Mn_{2/3}]$ layer, and the oxygen layer are layered.

The active material of the present embodiment is a solid solution of a lithium transition metal complex oxide expressed by $LiAO_2$, and is of a system that permits even Li as a metal element occupying the transition metal site, providing a so-called Li-rich layered positive electrode material. It goes without saying that the "solid solution" is distinguished from a mixture of compounds. For example, mixtures of, e.g., $LiNi_{0.5}Mn_{0.5}O_2$ powder or $LiNi_{0.33}Co_{0.33}Mn_{0.34}O_2$ powder, even if they apparently satisfy the compositional formula (1), are not included in the "solid solution". In a simple mixture, peak positions corresponding to each lattice constant that are observed when X-ray diffraction measurement is performed differ, so that one peak splits into two or three. On the other hand, in a "solid solution", one peak does not split. Thus, the "solid solution" and the mixture can be identified by the presence or absence of the splitting of X-ray diffraction measurement peaks.

For the sake of detailed description, the layered crystal structure will be described below on the assumption of the rhombohedral system and the space group R (−3)m structure.
(Active Material Manufacturing Method)

When the active material is manufactured, initially an active material precursor is prepared. The precursor has a composition corresponding to the compositional formula (1) below.

$$Li_y Ni_a Co_b Mn_c M_d O_x \qquad (1)$$

where the element M is at least one kind of element selected from the group consisting of Al, Si, Zr, Ti, Fe, Mg, Nb, Ba, and V, and $1.9 \leq (a+b+c+d+y) \leq 2.1$, $1.05 \leq y \leq 1.35$, $0 < a \leq 0.3$, $0 < b \leq 0.25$, $0.3 \leq c \leq 0.7$, $0 \leq d \leq 0.1$, $1.9 \leq x \leq 2.1$.

For example, the precursor of the present embodiment includes Li, Ni, Co, Mn, M (M is as described above) and O, and is a substance such that, as in the compositional formula (1), the molar ratio of Li, Ni, Co, Mn, M and O is y:a:b:c:d:x. A specific example of the precursor is a mixture obtained by compounding a compound (such as a salt) of each of Li, Ni, Co, Mn, and M and a compound containing O so as to satisfy the molar ratio, and then mixing and, if need, heating. One of the compounds contained in the precursor may comprise a plurality of elements selected from the group consisting of Li, Ni, Co, Mn, M, and O. Because the molar ratio of O in the precursor may vary depending on the precursor firing conditions (such as atmosphere or temperature), the molar ratio of O in the precursor may be outside the numerical value range of x.

The precursor is obtained by compounding the compounds below such that the molar ratio of the compositional formula (1) is satisfied. Specifically, the precursor can be manufactured from the compounds below by methods such as pulverization and mixing, thermal decomposition and mixing, precipitation reaction, or hydrolysis. In a particularly preferable method, a liquid raw material obtained by dissolving a manganese compound, a nickel compound, a cobalt compound, and a lithium compound with a solvent such as water is mix and stirred, followed by heat treatment. By drying this material, a complex oxide (precursor) having a uniform composition that readily crystallizes at low temperature can be easily fabricated as a precursor.

Concrete examples of the raw material for manufacturing the precursor are the following:

The lithium compound may include lithium acetate dihydrate, lithium hydroxide monohydrate, lithium carbonate, lithium nitrate, and lithium chloride.

The nickel compound may include nickel acetate tetrahydrate, nickel sulfate hexahydrate, nickel nitrate hexahydrate, and nickel chloride hexahydrate.

The cobalt compound may include cobalt acetate tetrahydrate, cobalt sulfate heptahydrate, cobalt nitrate hexahydrate, and cobalt chloride hexahydrate.

The manganese compound may include manganese acetate tetrahydrate, manganese sulfate pentahydrate, manganese nitrate hexahydrate, manganese chloride tetrahydrate, and manganese acetate tetrahydrate.

The M compound may include oxides or fluorides comprising an Al source, a Si source, a Zr source, a Ti source, a Fe source, a Mg source, a Nb source, a Ba source, or a V source. Example include compounds of aluminum nitrate nonahydrate, aluminum fluoride, iron sulfate heptahydrate, silicon dioxide, zirconium nitrate oxide dihydrate, titanium sulfate hydrate, magnesium nitrate hexahydrate, niobium oxide, barium carbonate, and vanadium oxide. By adjusting the compounded amounts of these raw materials, the active material with a small surface nickel concentration can be fabricated.

A raw material mixture prepared by adding a complexing agent to a solvent in which the compounds have been dissolved may be further mixed and stirred or heat-treated. As needed, for pH adjustment, an acid may be added to the raw material mixture. The kind of the complexing agent is not particularly designated. However, from the viewpoint of ease of availability and cost, preferable examples include citric acid, malic acid, tartaric acid, and lactic acid.

Preferably, the precursor has a specific surface area of 0.5 to 6.0 m²/g. This facilitates the crystallization of the precursor, facilitating an improvement in cycle characteristics. If the specific surface area of the precursor is smaller than 0.5 m²/g, the particle diameter of the precursor after firing (particle diameter of lithium transition metal oxide) becomes large, possibly eventually making the compositional distribution of the obtained active material non-uniform. If the specific surface area of the precursor is greater than 6.0 m²/g, the amount of water absorption by the precursor is increased, making the firing step difficult. If the amount of water absorption by the precursor is large, maintenance of a dry environment would become necessary, increasing the active material manufacturing cost. The specific surface area can be measured by a known BET-type powder specific surface area measuring device. If the specific surface area of the precursor is outside the above range, the temperature at which the precursor crystallizes tends to be increased. The specific surface area of the precursor may be adjusted by pulverizing method, a pulverizing medium, pulverizing time and the like.

The precursor manufactured by the above method is fired. By firing the precursor, the solid solution (active material) of the lithium transition metal oxide having the layered crystal structure and expressed by the following compositional formula (1) can be obtained.

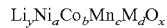

(1)

where the element M is at least one kind of element selected from the group consisting of Al, Si, Zr, Ti, Fe, Mg, Nb, Ba, and V; $1.9 \leq (a+b+c+d+y) \leq 2.1$; $1.05 \leq y \leq 1.35$; $0 < a \leq 0.3$; $0 < b \leq 0.25$; $0.3 \leq c \leq 0.7$; $0 \leq d \leq 0.1$; and $1.9 \leq x \leq 2.1$.

Preferably, the precursor firing temperature is 800 to 1100° C., and more preferably 850 to 1050° C. If the precursor firing temperature is less than 500° C., the precursor crystallization reaction does not sufficiently proceeds, whereby the crystallinity of the obtained lithium transition metal oxide will be lowered, which is not preferable. If the precursor firing temperature exceeds 1100° C., the amount of evaporation of lithium is increased. As a result, the lithium transition metal oxide having a lithium-lacking composition tends to be generated, which is not preferable. Further, if the temperature exceeds 1100° C., primary particles may be sintered together, resulting in a significant decrease in specific surface area, which is not preferable.

Preferably, the precursor firing atmosphere contains oxygen. Specifically, the atmosphere may include an atmosphere containing oxygen, such as a mixture gas of inert gas and oxygen, or air. Preferably, the precursor firing time is three hours or longer and more preferably five hours or longer.

While one manufacture method according to the present invention has been described, there are several other methods for making the active material structure such that the nickel concentration is lower in the surface than inside the primary particle, which characterizes the present invention. For example, after the precursor is completed, lithium carbonate may further be added before firing, or the oxygen content during firing may be adjusted, or such methods may be combined, and still the structural feature of the present invention can be obtained.

Preferably, the positive electrode active material powder has an average particle diameter in the range of from 0.2 to 1.0 μm and more preferably in the range of from 0.2 to 0.5 μm. Even more preferably, there are no coarse particles of 10 μm or more.

Preferably, the negative electrode active material powder has an average particle diameter of not more than 100 μm. By using such fine positive electrode active material, the high output characteristics of the lithium ion secondary battery can be further improved.

In order to obtain the active material powder having the desired particle diameter and shape, a pulverizer or a classifier may be used. For example, a mortar, a ball mill, a bead mill, a sand mill, a vibratory ball mill, a planetary ball mill, a jet mill, a counter-jet mill, a spiral-flow type jet mill, or a sieve is used. For pulverization, wet pulverization where an organic solvent, such as water or hexane, coexists may be used. The classification method is not particularly limited, and a sieve, a wind force classifier, and the like, either of dry or wet type, may be used as needed.

(Lithium Ion Secondary Battery)

As illustrated in FIG. 1, a lithium ion secondary battery 100 according to the present embodiment is provided with: an electricity generation element 30 including a plate-like negative electrode 20 and a plate-like positive electrode 10 facing each other, and a plate-like separator 18 disposed adjacently between the negative electrode 20 and the positive electrode 10; a casing 50 housing an electrolyte solution containing lithium ion and the electrodes in a sealed state; a negative electrode lead 62 one end of which is electrically connected to the negative electrode 20 and the other end of which is protruding outside the casing; and a positive electrode lead 60 one end of which is electrically connected to the positive electrode 10 and the other end of which is protruding outside the casing.

The negative electrode 20 includes a negative electrode collector 22, and a negative electrode active material layer 24 formed on the negative electrode collector 22. The positive electrode 10 includes a positive electrode collector 12, and a positive electrode active material layer 14 formed on the positive electrode collector 12. The separator 18 is positioned between the negative electrode active material layer 24 and the positive electrode active material layer 14.

The positive electrode active material layer 14 contains the positive electrode active material having a layered crystal structure and expressed by the compositional formula (1).

As the negative electrode active material used for the negative electrode of the lithium ion secondary battery, any material capable of precipitating or occluding lithium ion may be selected. Examples include titanium system material such as lithium titanate having a spinel type crystal structure, as represented by $Li[Li_{1/3}Ti_{5/3}]O_4$; an alloyed material lithium metal, such as Si, Sb, or Sn system; lithium alloys (lithium-silicon, lithium-aluminum, lithium-lead, lithium-tin, lithium-aluminum-tin, lithium-gallium, and a lithium metal containing alloy, such as Wood's alloy); lithium complex oxide (lithium-titanium); silicon oxide; alloys capable of occlude and releasing lithium; and carbon material (such as graphite, hard carbon, low-temperature baked carbon, and amorphous carbon).

The positive electrode active material layer 14 and the negative electrode active material layer 24 may contain, in addition to the above-described principal constituent components, a conduction aid, a binder, a thickening agent, or a filler as other constituent components.

The conduction aid is not limited as long as it is an electron conductive material that does not adversely affect battery performance. Normally, examples include conductive materials such as: natural graphite (such as scaly graphite, flaky graphite, or earthy graphite); artificial graphite; carbon black; acetylene black, Ketjen black, carbon whisker, carbon fiber, metal (such as copper, nickel, aluminum, silver, or gold) powder; metal fiber; and conductive ceramics material. These conduction aids may be used either individually or in mixture.

Particularly, as the conduction aid, acetylene black may be preferable from the viewpoint of electron conductivity and ease of coating. Preferably, the added amount of the conduction aid is 0.1 wt % to 50 wt % with respect to the total weight of the positive electrode active material layer or the negative electrode active material layer, and more preferably from 0.5 wt % to 30 wt %. Particularly, acetylene black is preferable as it enables, when pulverized to ultrafine particles of 0.1 to 0.5 μm before use, a reduction of the required amount of carbon. These are mixed physically, ideally uniformly. For this purpose, the mixing may be performed by a powder mixer, such as a V type mixer, an S type mixer, a grinding machine, a ball mill, or a planetary ball mill, either in dry or wet type.

As the binder, normally, thermoplastic resin such as polytetrafluoroethylene (PTFE), polyvinylidene fluoride (PVDF), polyethylene, or polypropylene, and a polymer having rubber elasticity, such as ethylene-propylene-diene terpolymer (EPDM), sulfonated EPDM, styrene butadiene rubber (SBR), or fluororubber may be used as a mixture of one or two or more kinds. The added amount of the binder is preferably 1 to 50 wt %, and more preferably 2 to 30 wt %, with respect to the total weight of the positive electrode active material layer or the negative electrode active material layer.

As the thickening agent, normally, polysaccharides and the like, such as carboxymethyl cellulose or methyl cellulose, may be used as a mixture of one or two or more kinds. Preferably, the thickening agent having a functional group that reacts with lithium, such as polysaccharides, the functional group is deactivated by methylation, for example. The added amount of the thickening agent is preferably 0.5 to 10 wt %, and more preferably 1 to 2 wt %, with respect to the total weight of the positive electrode active material layer or the negative electrode active material layer.

As the filler, any material that does not adversely affect battery performance may be used. Normally, olefin system polymer such as polypropylene or polyethylene, amorphous silica, alumina, zeolite, glass, or carbon and the like is used. The added amount of the filler is preferably not more than 30 wt % with respect to the total weight of the positive electrode active material layer or the negative electrode active material layer.

The positive electrode active material layer or the negative electrode active material layer is preferably fabricated by kneading the principal constituent components (positive electrode active material or negative electrode active material) and the other materials (such as conduction aid, binder, thickening agent, or filler) into a combination, mixing the combination with an organic solvent such as N-methylpyrrolidone or toluene, coating or pressure joining the resultant liquid mixture onto the collector, and then conducting heat treatment at temperature on the order of 50° C. to 250° C. for about 2 hours. The coating method may include roller coating using an applicator roll, screen coating, doctor blade system, spin coating, or using a bar coater to coat at an arbitrary thickness and an arbitrary shape; however, the method is not limited to the above means.

As the electrode collector, iron, copper, stainless, nickel, or aluminum may be used. The electrode collector may be in the form of a sheet, foam, mesh, porous material, or expanded metal grating. Further, the collector may be provided with an opening with an arbitrary shape.

The electrolyte solution containing lithium ion is a nonaqueous electrolyte which may be a nonaqueous electrolyte generally proposed for use in lithium batteries and the like. Examples of nonaqueous solvent used in the nonaqueous electrolyte include annular carbonic esters such as propylene carbonate, ethylene carbonate, butylene carbonate, chloroethylene carbonate, or vinylenecarbonate; annular esters such as γ-butyrolactone or γ-valerolactone; chain carbonates such as dimethyl carbonate, diethylcarbonate, or ethylmethyl carbonate; chain esters such as methyl formate, methyl acetate, or methyl buryrate; tetrahydrofuran or its derivative; ethers such as 1,3-dioxane, 1,4-dioxane, 1,2-dimethoxyethane, 1,4-dibutoxyethane, methyl diglyme; nitriles such as acetonitrile or benzonitrile; dioxolane or its derivative; ethylene sulfide; sulfolane; and sultone or its derivative, either individually or in a mixture of two or more kinds thereof; however, the solvent is not limited to the above.

Further, an electrolytic solution and a solid electrolyte may be combined. As the solid electrolyte, crystalline or amorphous inorganic solid electrolyte may be used. Examples of the crystalline inorganic solid electrolyte include LiI, $Li_3N$, $Li_{1+x}M_xTi_{2-x}(PO_4)_3$ (M=Al, Sc, Y, La), $Li_{0.5-3x}R_{0.5+x}TiO_3$ (R=La, Pr, Nd, Sm), or thio-LISICON represented by $Li_{4-x}Ge_{1-x}P_xS_4$. Examples of the amorphous inorganic solid electrolyte include LiI—Li$_2$O—B$_2$O$_5$ system, Li$_2$O—SiO$_2$ system, LiI—Li$_2$S—B$_2$S$_3$ system, LiI—Li$_2$S—SiS$_2$ system, and Li$_2$S—SiS$_2$—Li$_3$PO$_4$ system.

Examples of electrolyte salt used in the nonaqueous electrolyte include inorganic ionic salt containing one of lithium (Li), sodium (Na), or potassium (K), such as LiClO$_4$, LiBF$_4$, LiAsF$_6$, LiPF$_6$, LiSCN, LiBr, LiI, Li$_2$SO$_4$, Li$_2$B$_{10}$Cl$_{10}$, NaClO$_4$, NaI, NaSCN, NaBr, KClO$_4$, or KSCN; and organic ionic salts such as LiCF$_3$SO$_3$, LiN(CF$_3$SO$_2$)$_2$, LiN (C$_2$F$_5$SO$_2$)$_2$, LiN(CF$_3$SO$_2$)(C$_4$F$_9$SO$_2$), LiC(CF$_3$SO$_2$)$_3$, LiC(C$_2$F$_5$SO$_2$)$_3$, (CH$_3$)$_4$NBF$_4$, (CH$_3$)$_4$NBr, (C$_2$H$_5$)$_4$NClO$_4$, (C$_2$H$_5$)$_4$NI, (C$_3$H$_7$)$_4$NBr, (n-C$_4$H$_9$)$_4$NClO$_4$, (n-C$_4$H$_9$)$_4$NI, (C$_2$H$_5$)$_4$N-maleate, (C$_2$H$_5$)$_4$N-benzoate, (C$_2$H$_5$)$_4$N-phtalate, lithium stearylsulfonate, lithium octyl sulfonate, and lithium dodecylbenzene sulfonate. These ionic compounds may be used either individually or in a mixture of two or more kinds. Particularly, the active material according to the present embodiment does not easily chemically react with the electrolyte salt containing F, such as LiBF$_4$, LiAsF$_6$, or LiPF$_6$, so that durability is high.

Further preferably, lithium salt having the perfluoroalkyl group, such as LiPF$_6$ or LiN(C$_2$F$_5$SO$_2$)$_2$, is mixed. In this way, the viscosity of the electrolyte can be further lowered, whereby the low temperature characteristics can be further improved and self-discharge can be suppressed.

As the nonaqueous electrolyte, ordinary temperature molten salt or an ionic liquid may be used.

Preferably, the electrolyte salt in the nonaqueous electrolyte has a concentration of from 0.1 mol/l to 5 mol/l and more preferably from 0.5 mol/l to 2.5 mol/l. In this way, the lithium ion secondary battery having high battery characteristics can be reliably obtained.

Preferably, as the separator for the lithium ion secondary battery, a porous film and non-woven fabric and the like that exhibit excellent high-rate discharge performance are used individually or in combination. Examples of the material of the lithium ion secondary battery separator include polyolefin system resins represented by polyethylene and polypropylene; polyester system resin represented by polyethylene terephthalate and polybutylene terephthalate; polyvinylidene fluoride; vinylidene fluoride-hexafluoro propylene copolymer; vinylidene fluoride-perfluorovinyl ether copolymer; vinylidene fluoride-tetrafluoroethylene copolymer; vinylidene fluoride-trifluoroethylene copolymer; vinylidene fluoride-fluoroethylene copolymer; vinylidene fluoride-hexafluoroacetone copolymer; vinylidene fluoride-ethylene copolymer; vinylidene fluoride-propylene copolymer; vinylidene fluoride-trifluoro propylene copolymer; vinylidene fluoride-tetrafluoroethylene-hexafluoro propylene copolymer; and vinylidene fluoride-ethylene-tetrafluoroethylene copolymer.

Preferably, the lithium ion secondary battery separator has a porosity of not more than 98 vol % from the viewpoint of strength. Preferably, the porosity is not less than 20 vol % from the viewpoint of charging and discharging characteristics.

As the lithium ion secondary battery separator, a polymer gel comprising a polymer such as acrylonitrile, ethylene oxide, propylene oxide, methyl methacrylate, vinyl acetate, vinyl pyrrolidone, or polyvinylidene fluoride and an electrolyte may be used. When a gel state nonaqueous electrolyte is used, the effect of preventing liquid leakage can be obtained.

While the preferred embodiment of the present invention has been described in detail, the present invention is not limited to the embodiment.

For example, the shape of the lithium ion secondary battery is not limited to the one illustrated in FIG. 1. For example, the lithium ion secondary battery may be rectangular, elliptical, coin-shaped, button-shaped, or sheet-shaped.

The active material of the present embodiment may be used as the electrode material of an electrochemical element other than lithium ion secondary batteries. Examples of such electrochemical elements include secondary batteries other than the lithium ion secondary battery such as a metal lithium secondary battery (using an electrode containing the active material obtained in accordance with the present invention as the positive electrode, and using metal lithium as the negative electrode), and electrochemical capacitors such as a lithium ion capacitor. These electrochemical elements may be used for purposes of a power supply for self-propelled micromachines or IC cards, or a distributed power supply on or in a printed board.

EXAMPLES

In the following, the present invention will be described in more specific terms with reference to examples and comparative examples. It should be noted, however, that the present invention is not limited to the following examples.

First Example

Fabrication of Precursor 37.10 g of lithium acetate dihydrate, 8.30 g of cobalt acetate tetrahydrate, 40.11 g of manganese acetate tetrahydrate, and 11.43 g of nickel acetate tetrahydrate were dissolved in distilled water, and, after citric acid was added, the mixture was reacted for 10 hours while heating and stirring. The resultant precursor reaction product was dried at 120° C. for 24 hours to remove water, and then heat-treated at 500° C. for 5 hours to remove organic components, obtaining reddish-brown powder (precursor of Example 1). By adjusting the compounded amount of lithium acetate dihydrate, nickel acetate tetrahydrate, manganese acetate tetrahydrate, and cobalt acetate tetrahydrate in the raw material mixture, the numbers of moles of lithium, nickel, cobalt, and manganese contained in the precursor were adjusted to be equivalent to 0.30 mol of Li$_{1.20}$Ni$_{0.15}$Co$_{0.11}$Mn$_{0.54}$O$_2$. Namely, the number of moles of each element in the raw material mixture was adjusted so that 0.30 mol of Li$_{1.20}$Ni$_{0.15}$Co$_{0.11}$Mn$_{0.54}$O$_2$ can be produced from the precursor of Example 1. Citric acid as the complexing agent was added by the equivalent number of moles to the number of moles 0.30 mol of the active material obtained from the precursor of Example 1, i.e., by 0.30 mol.

[Fabrication of Active Material]

To the precursor was added lithium carbonate equivalent to 0.08 mol %. After mixing for 30 minutes, the mixture was fired at 950° C. for 10 hours at the oxygen concentration of 50 vol %, obtaining the lithium transition metal oxide (active material) of Example 1. The crystal structure of the lithium transition metal oxide of Example 1 was analyzed by powder X-ray diffraction method. As a result, it was confirmed that the active material of Example 1 has the main phase of the rhombohedral system, space group R (−3)m structure. In the X-ray diffraction pattern of the active material of Example 1, a distinctive diffraction peak of the space group C2/m structure of the monoclinic system of the Li$_2$MnO$_3$ type was observed at around 20 to 25° of 2θ.

<Composition Analysis>

As a result of composition analysis by inductively coupled plasma method (ICP method), it was confirmed that the composition of the lithium transition metal oxide (active material) of Example 1 was $Li_{1.28}Ni_{0.15}Co_{0.11}Mn_{0.54}O_2$. It was also confirmed that the molar ratio of each metal element in the active material of Example 1 corresponded to the molar ratio of each metal element in the precursor of Example 1. Namely, it was confirmed that the composition of the lithium transition metal oxide (active material) obtained from the precursor can be accurately controlled by adjusting the molar ratios of the metal elements in the precursor.

<Composition Analysis of Primary Particle>

Figure 2A:
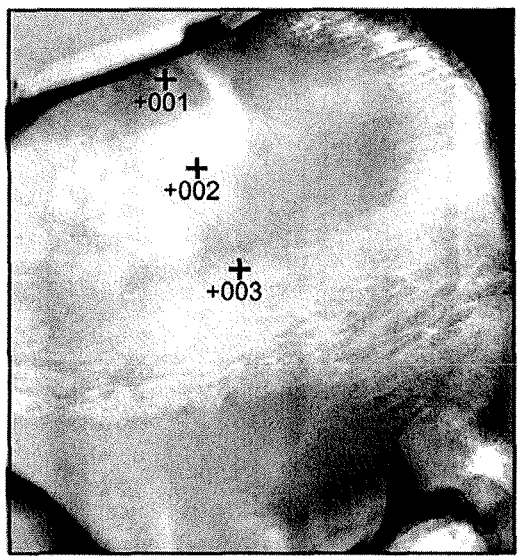
FIG. 2 (a) shows a photograph of an active material primary particle according to Example 1 taken with a scanning transmission electron microscope (STEM), "+" portions in the photograph indicating portions where point analysis was conducted by an energy dispersive X-ray spectroscopy (EDS) device attached to the STEM.

The primary particle of the lithium transition metal oxide (active material) of Example 1 was observed using a transmission electron microscope (TEM), and, using the energy dispersive X-ray spectroscopy device (EDS) attached to the TEM, point analysis was conducted at the center portion of the primary particle and near the particle surface (in the range of 30 nm from the surface) so as to calculate the element content ratios. While the number of the measurement points is not particularly limited; however, the number is preferably not less than five. FIG. 2(a) shows a TEM image of Example 1. In this case, +001 corresponds to the Ni composition amount $Ni_\beta$ in the vicinity of the particle surface, and the point+003 corresponds to the Ni composition amount $Ni_\alpha$ at the particle center portion.

[Fabrication of Positive Electrode]

A positive electrode paint was prepared by mixing the lithium transition metal oxide of Example 1 (active material), a conduction aid, and a solvent containing a binder. The positive electrode paint was coated to an aluminum foil (thickness 20 μm) as the positive electrode collector by doctor blade process, dried at 100° C., and then rolled. As a result, the positive electrode comprising a lithium transition metal oxide (active material) layer and a positive electrode collector was obtained. As the conduction aid, carbon black and graphite were used. As the binder-containing solvent, N-methyl-2-pyrrolidone in which PVDF had been dissolved was used.

[Fabrication of Negative Electrode]

A negative electrode paint was prepared by the same method as for the positive electrode paint with the exception that, instead of the active material of Example 1, natural graphite was used, and that only carbon black was used as the conduction aid. The negative electrode paint was coated onto a copper foil (thickness 16 μm) as the negative electrode collector by doctor blade process, followed by drying at 100° C. and rolling. As a result, the negative electrode comprising a negative electrode active material layer and a negative electrode collector was obtained.

[Fabrication of Lithium Ion Secondary Battery]

The positive electrode and the negative electrode prepared as described above and a separator (micro-porous film made of polyolefin) were cut into predetermined size. The positive electrode and the negative electrode were provided with portions without the electrode paint coating for welding external lead terminals. The positive electrode, the negative electrode, and the separator were then layered in this order. During the layering, a small amount of hot melt adhesive (ethylene-methacrylic acid copolymer, EMAA) was applied for fixing so as to prevent the positive electrode, the negative electrode, and the separator from being displaced from one another. To the positive electrode and the negative electrode, an aluminum foil (width 4 mm, length 40 mm, thickness 100 μm) and a nickel foil (width 4 mm, length 40 mm, thickness 100 μm) respectively were ultrasonic-welded to provide the external lead terminals. On the external lead terminals, polypropylene (PP) with maleic anhydride grafting was wound and thermally adhered. This is performed so as to increase the sealing property between the external terminals and an exterior member. As the battery exterior member in which the battery element of the layered positive electrode, negative electrode, and separator was enclosed, an aluminum laminate material comprising a PET layer, an Al layer, and a PP layer was used. The PET layer had a thickness of 12 μm. The Al layer had a thickness of 40 μm. The PP layer had a thickness of 50 μm. "PET" is an abbreviation of polyethylene terephthalate, and "PP" is an abbreviation of polypropylene. During the fabrication of the battery exterior member, the PP layer was disposed on the inside of the exterior member. In the exterior member, the battery element was placed and an appropriate amount of electrolytic solution was injected, and then the exterior member was vacuum-sealed. Thus, the lithium ion secondary battery in which the lithium transition metal oxide of Example 1 was used was completed. As the electrolytic solution, a mixed solvent of ethylene carbonate (EC) and dimethyl carbonate (DMC) in which $LiPF_6$ was dissolved at the concentration of 1M (1 mol/L) was used. The volume ratio of EC and DMC in the mixed solvent was EC:DMC=30:70.

[Measurement of Electric Characteristics]

After the battery of Example 1 was charged and discharged once and then charged at low current to 4.8 V at a current value of 30 mA/g, the battery was constant-current discharged at a current value of 30 mA/g to 2.0 V. The initial discharge capacity of Example 1 was 211 mAh/g. This charging and discharging cycle was repeated 50 cycles in a cycle test, which was conducted at 25° C. When the initial discharge capacity of the battery of Example 1 was 100%, the discharge capacity after the 50 cycles was 96%. Hereafter, the ratio of the discharge capacity after 50 cycles to the initial discharge capacity of 100% will be referred to as the cycle characteristics. The initial discharge capacity refers to second charging and discharging data, i.e., the discharge capacity after charging and discharging once and then constant-current charged to 4.8 V, followed by constant-current discharging to 2.0 V. High cycle characteristics indicate that the battery has excellent cycle characteristics. A battery with the initial discharge capacity of not less than 190 mAh/g and the cycle characteristics of not less than 85% is evaluated as "A". A battery with the initial discharge capacity of less than 190 mAh/g, or a battery with the cycle characteristics of less than 85% is evaluated as "F".

Examples 2 to 4

In Examples 2 and 3, the lithium transition metal oxide was fabricated by adjusting the amount of lithium carbonate added to the precursor.

In Example 2, after adding lithium carbonate equivalent to 0.04 mol % to the precursor adjusted to the composition amount of $Li_{1.20}Ni_{0.15}Co_{0.11}Mn_{0.54}O_2$ and then mixing for 30 minutes, firing was performed at 950° C. for 10 hours at the oxygen concentration of 50 vol %, obtaining a lithium transition metal oxide.

In Example 3, after adding lithium carbonate equivalent to 0.12 mol % to the precursor adjusted the composition amount of $Li_{1.20}Ni_{0.15}Co_{0.11}Mn_{0.54}O_2$ and mixing for 30 minutes, firing was performed at 950° C. for 10 hours at the oxygen concentration of 50 vol %, obtaining a lithium transition metal oxide.

In Example 4, after adding lithium carbonate equivalent to 0.15 mol % to the precursor adjusted to the composition amount of $Li_{1.20}Ni_{0.15}Co_{0.11}Mn_{0.54}O_2$ and mixing for 30 minutes, firing was performed at 950° C. for 10 hours at the oxygen concentration of 50 vol %, obtaining a lithium transition metal oxide.

Figure 2B:
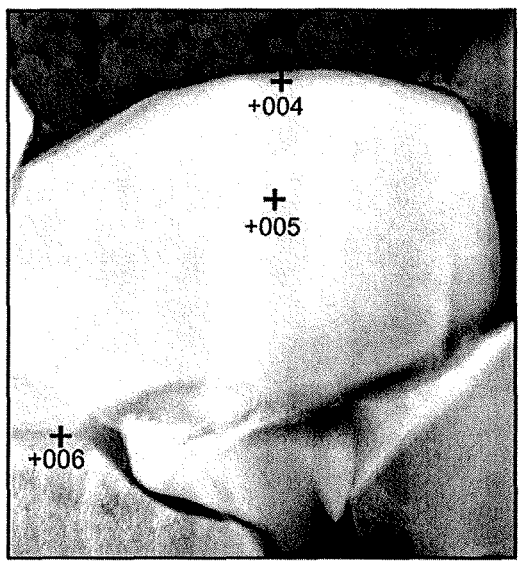

In Comparative Example 1, without adding lithium carbonate to the precursor adjusted to the composition amount of $Li_{1.20}Ni_{0.15}Co_{0.11}Mn_{0.54}O_2$, firing was performed at 950° C. for 10 hours at the oxygen concentration of 50 vol %, obtaining a lithium transition metal oxide. FIG. 2 (b) shows a TEM image of Comparative Example 1. In this case, +004 corresponds to the Ni composition amount $Ni_\beta$ in the vicinity of the particle surface, and the point +005 corresponds to the Ni composition amount $Ni_\alpha$ at the particle center portion. In Comparative Example 1, while the compositional formula $Li_yNi_aCo_bMn_cM_dO_x$ is in the range of the present invention, the Ni composition amount $Ni_\beta/Ni_\alpha$ is outside the range of the present invention.

In Comparative Example 2, the precursor adjusted to the composition amount of $Li_{1.30}Ni_{0.15}Co_{0.11}Mn_{0.54}O_2$ was fired at 950° C. for 10 hours at the oxygen concentration of 50 vol %, obtaining a lithium transition metal oxide.

Examples 5 to 10, Comparative Examples 3 to 5

In Examples 5 to 10 and Comparative Examples 3 to 5, after the amounts of the Co source, Ni source, and Mn source in the precursor raw material mixture were adjusted, lithium carbonate equivalent to 0.08 mol % was added and mixed for 30 minutes, and then firing was performed at 950° C. for 10 hours at the oxygen concentration of 50 vol %, fabricating lithium transition metal oxides. In Comparative Examples 3 to 5, while the Ni composition amount $Ni_\beta/Ni_\alpha$ is in the range of the present invention, the compositional formula $Li_yNi_aCo_bMn_cM_dO_x$ is outside the range of the present invention.

Examples 11 to 19

In Examples 11 to 19, after the composition of the raw material mixture for the precursor was adjusted as described below, lithium carbonate equivalent to 0.08 mol % was added and mixed for 30 minutes, followed by firing at 950° C. for 10 hours at the oxygen concentration of 50 vol %, thereby obtaining lithium transition metal oxides. Namely, in Example 11, as the source of M expressed by expression (1), aluminum nitrate nonahydrate was used as the Al source in the precursor raw material mixture. In Example 12, vanadium oxide was used as the V source in the precursor raw material mixture. In Example 13, silicon dioxide was used as the Si source in the precursor raw material mixture. In Example 14, magnesium nitrate hexahydrate was used as the Mg source in the precursor raw material mixture. In Example 15, zirconium nitrate oxide dihydrate was used as the Zr source in the precursor raw material mixture. In Example 16, titanium sulfate hydrate was used as the Ti source in the precursor raw material mixture. In Example 17, iron sulfate heptahydrate was used as the Fe source in the precursor raw material mixture. In Example 18, barium carbonate was used as the Ba source in the precursor raw material mixture. In Example 19, niobium oxide was used as the Nb source in the precursor raw material mixture.

Figure 3:
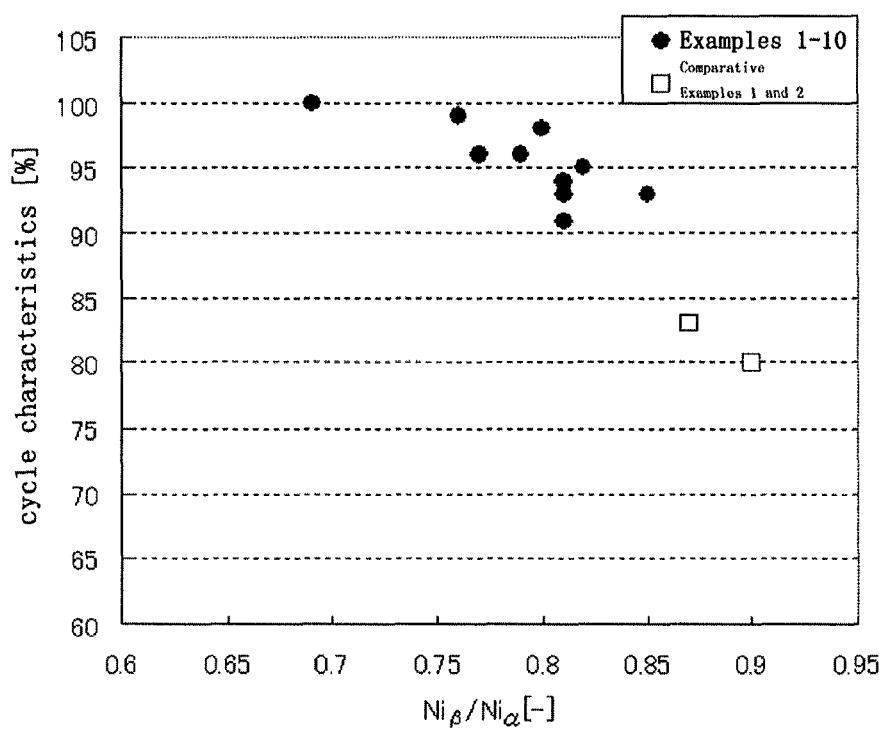
FIG. 3 is a distribution diagram illustrating the relationship between $Ni_\beta/Ni_\alpha$ and cycle characteristics of the active materials according to Examples 1 to 10 of the present invention and Comparative Examples 1 and 2.
Figure 4:
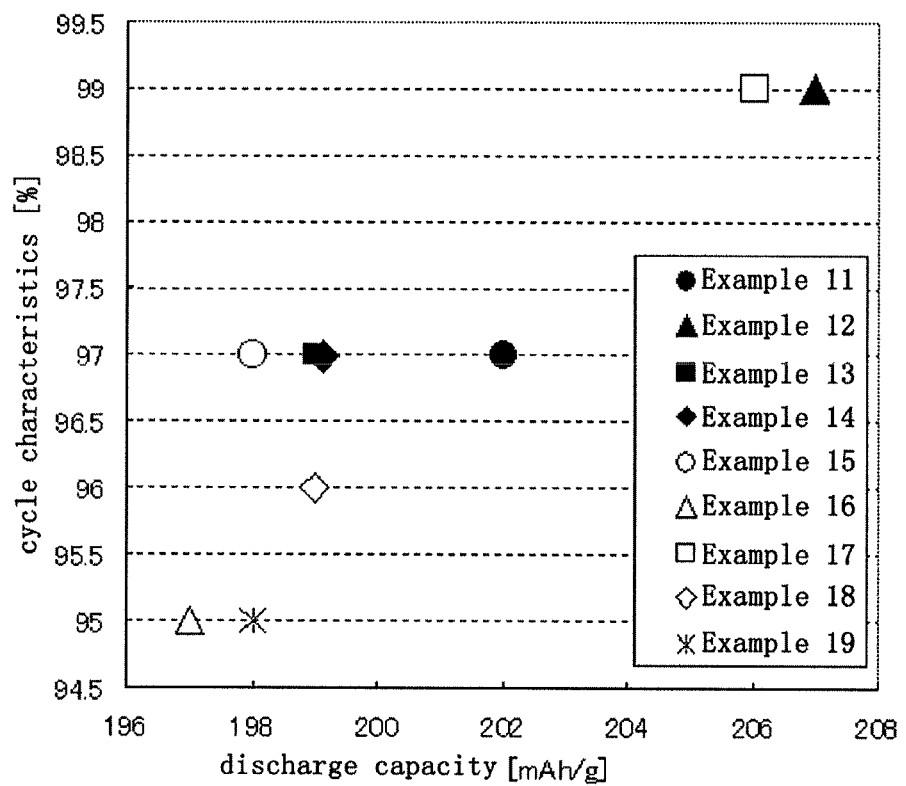
FIG. 4 is a distribution diagram illustrating the relationship between initial discharge capacity and cycle characteristics of the active material according to Examples 11 to 19 of the present invention.

Table 1 shows the results of evaluation of the initial discharge capacity and cycle characteristics of the batteries according to Examples 2 to 19 and Comparative Examples 1 to 5 by the same method as in Example 1. In the table below, the high-capacity and excellent charging/discharging cycle characteristics batteries having the capacity of not less than 190 mAh/g and the cycle characteristics of not less than 85% are evaluated as "A". The batteries having the capacity of less than 190 mAh/g, or the batteries having the cycle characteristics of less than 85% are evaluated as "F". FIG. 3 shows the relationship between $Ni_\beta/Ni_\alpha$ and the cycle characteristics of Examples 1 to 10 and Comparative Examples 1 and 2. FIG. 4 shows the relationship between the initial discharge capacity and the cycle characteristics of Examples 11 to 19.

As shown in Table 1, it was confirmed that the lithium ion secondary batteries of Examples 1 to 19 provided the effect of the present invention, i.e., high capacity and excellent cycle characteristics. On the other hand, in Comparative Examples 1 and 2, the desired characteristics were not obtained due to the high nickel concentration in the surface. In Comparative Examples 3 to 5, the desired characteristics were not obtained because the active material composition was outside the predetermined range.

INDUSTRIAL APPLICABILITY

The present invention contributes to the manufacture and use of not just an active material having high capacity and excellent cycle characteristics, but also electrochemical elements such as a lithium ion secondary battery, thus providing an industrial applicability.

REFERENCE SIGNS LIST

10 Positive electrode
20 Negative electrode
12 Positive electrode collector
14 Positive electrode active material layer
18 Separator
22 Negative electrode collector
24 Negative electrode active material layer
30 Electricity generation element
50 Casing
60, 62 Lead
100 Lithium ion secondary battery

The invention claimed is:
1. An active material in the form of a solid solution for lithium ion secondary battery, the active material having a layered crystal structure and expressed by a compositional formula (1) below,
$Li_yNi_aCo_bMn_cM_dO_x$ (1) where M is at least one element selected from the group consisting of Al, Si, Zr, Ti, Fe, Mg, Nb, Ba, and V; $1.9 \leq (a+b+c+d+y) \leq 2.1$; $1.05 \leq y \leq 1.35$; $0 < a \leq 0.3$; $0 < b \leq 0.25$; $0.3 \leq c \leq 0.7$; $0 \leq d \leq 0.1$; and $1.9 \leq x \leq 2.1$,
wherein $0.69 \leq Ni_\beta/Ni_\alpha \leq 0.85$, where $Ni_\alpha$ is a Ni composition amount at a center portion of a primary particle of the active material, and $Ni_\beta$ is a Ni composition amount in a region extending from the active material surface in a depth direction by approximately 30 nm,
wherein FWHM (003) in x-ray diffraction pattern/FWHM (104) in x-ray diffraction pattern $\leq 0.57$.
2. The active material for lithium ion secondary battery according to claim 1, wherein the element M is Fe or V, and d is $0 < d \leq 0.1$.
3. A lithium ion secondary battery comprising:
a positive electrode including a positive electrode collector and a positive electrode active material layer containing a positive electrode active material;

a negative electrode including a negative electrode collector and a negative electrode active material layer containing a negative electrode active material;

a separator positioned between the positive electrode active material layer and the negative electrode active material layer; and an electrolyte in contact with the negative electrode, the positive electrode, and the separator, wherein the positive electrode active material contains the active material according to claim 1.

4. A lithium ion secondary battery comprising:

a positive electrode including a positive electrode collector and a positive electrode active material layer containing a positive electrode active material;

a negative electrode including a negative electrode collector and a negative electrode active material layer containing a negative electrode active material;

a separator positioned between the positive electrode active material layer and the negative electrode active material layer; and an electrolyte in contact with the negative electrode, the positive electrode, and the separator, wherein the positive electrode active material contains the active material according to claim 2.

5. The active material for lithium ion secondary battery according to claim 1, wherein $1.10 \leq y \leq 1.35$.

6. The active material for lithium ion secondary battery according to claim 1, wherein $1.15 \leq y \leq 1.35$.

7. The active material for lithium ion secondary battery according to claim 1, wherein $1.20 \leq y \leq 1.35$.

8. The active material for lithium ion secondary battery according to claim 1, wherein the primary particle has an average particle diameter of 0.2 to 1.0 µm.

9. The active material for lithium ion secondary battery according to claim 1, wherein the primary particle has an average particle diameter of 0.2 to 0.5 µm.

10. The active material for lithium ion secondary battery according to claim 1, which has an FWHM (003) in x-ray diffraction pattern $\leq 0.13°$.

11. The active material for lithium ion secondary battery according to claim 1, which has an FWHM (010) in x-ray diffraction pattern $\leq 0.15°$.

12. The active material for lithium ion secondary battery according to claim 1, which has an FWHM (104) in x-ray diffraction pattern $\leq 0.20°$.

* * * * *